Feb. 9, 1926.

R. H. MUELLER ET AL 1,571,958

AIR OPERATED TESTING DEVICE

Filed Nov. 3, 1921

Inventors:
Robert H. Mueller
and Chester W. Hathaway,
By Cushman, Bryant Warby
Att'ys.

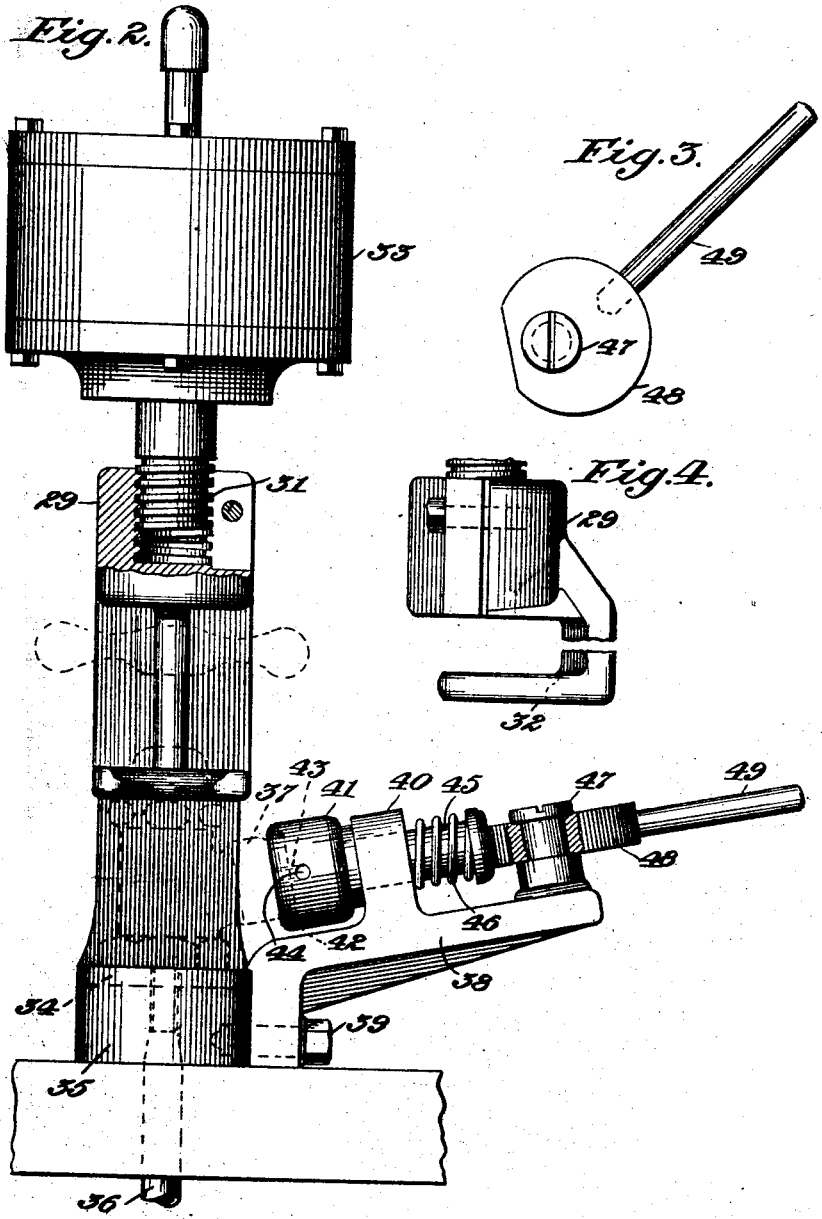

Feb. 9, 1926. 1,571,958
R. H. MUELLER ET AL
AIR OPERATED TESTING DEVICE
Filed Nov. 3, 1921    3 Sheets-Sheet 3

Inventors:
Robert H. Mueller
and Chester W. Hathaway,
By Cushman, Bryant & Darby
Att'ys.

Patented Feb. 9, 1926.

1,571,958

UNITED STATES PATENT OFFICE.

ROBERT H. MUELLER AND CHESTER W. HATHAWAY, OF DECATUR, ILLINOIS, ASSIGNORS TO ADOLPH MUELLER, TRUSTEE, OF DECATUR, ILLINOIS.

AIR-OPERATED TESTING DEVICE.

Application filed November 3, 1921. Serial No. 512,696.

*To all whom it may concern:*

Be it known that we, ROBERT H. MUELLER and CHESTER W. HATHAWAY, citizens of the United States, residing at Decatur, in the county of Macon and State of Illinois, have invented new and useful Improvements in Air-Operated Testing Devices, of which the following is a specification.

The invention herein disclosed relates to testing apparatus, and is intended for use in the testing for porosity of cocks, pipe sections, and similar articles having fluid passages therethrough, it being designed, furthermore, for testing key cocks for key leakage as well as for porosity of the metal of which they are formed.

It will be shown as applied to key cocks, but it will be understood that it may be used with articles other than those specifically shown, as this disclosure is merely illustrative, and in no sense restrictive, of the invention.

In order that the development may be clear to those skilled in the art, there is shown in the accompanying drawings physical embodiments of that invention, and in said drawings:

Fig. 2 is a view in elevation, substantially at right angles to the view shown in Fig. 1, looking from the left, illustrating attachments for the device shown in Fig. 1 for use in testing an angle cock.

Fig. 3 is a view of the operating lever for the pressure head attachment shown in Fig. 2.

Fig. 4 is a detail view of the cock holding arm of Fig. 2.

Figure 1:
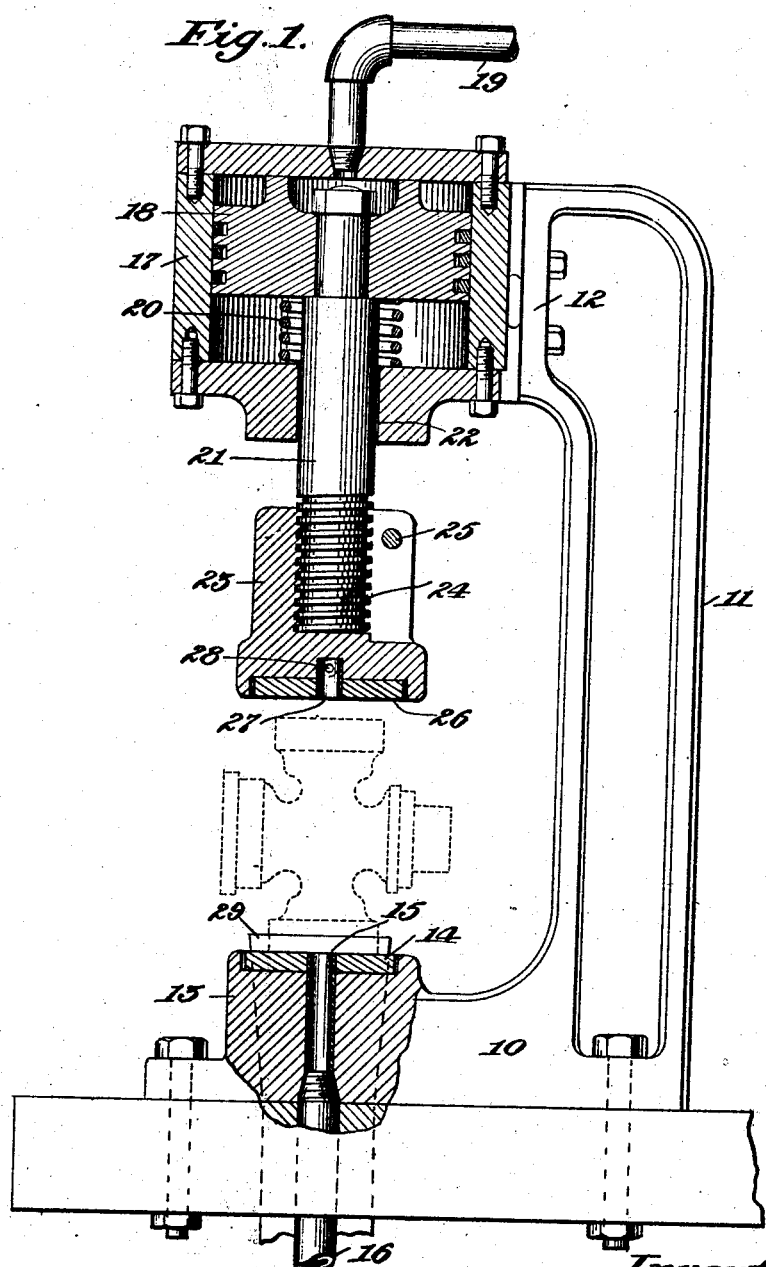
Fig. 1 is a view in side elevation of the device, parts of the structure being broken away for clearness of illustration.

Referring to the drawings by numbers, like numbers indicating like parts in the several views, the device comprises a suitable frame, mounted upon any proper support, said frame having the base 10, standard 11 rising from said base, and, at its upper end, said standard is provided with a head 12 to which the operating parts are secured.

The base 10 has a recessed boss 13, in which is mounted a cock-receiving seat or pad 14 of resilient or yielding material, and, preferably, the said yielding seat 14 is somewhat loosely mounted, as shown, within the recess, so that in event of water getting beneath the pad, it will not be trapped and, due to pressure, unseat the pad 14 from the recessed boss 13. The said pad 14 is centered in its seat by means of the pipe 15, which passes upwardly through the base 10 and the boss 13, and through a suitable aperture in the pad 14; the said pipe 15, as will hereinafter appear, being for the purpose of supplying fluid under pressure for testing purposes, any suitable supply, as 16, being provided for the pipe 15.

Secured to the head 12 of the standard 11 is the fluid pressure cylinder 17, of any suitable type, and within that fluid pressure cylinder is the reciprocating piston 18. The piston 18, as here shown, is given its thrust in one direction by fluid pressure coming from the pipe 19, which is connected with any suitable source and provided with any suitable inlet and exhaust valve controls, so that the operator, at will, can throw pressure against the piston 18 or release it. The piston 18 is actuated in the opposite direction in the present disclosure, by the spring 20, which normally tends to raise it, but it is obvious that, if desired, the piston could be operated by pressure in both directions by making the suitable connections, as is common in operating pistons by fluid pressure. In the construction shown in Fig. 1, in which the lifting spring 20 is utilized to raise the piston 18, thrust rod 21, and the head 23, it will be seen that an automatic release of the article held in the apparatus will be effected, for immediately pressure is released above the piston 18, the spring 20 will move the piston and its associated parts upwardly, releasing the article held between pressure heads, and no manual operation to effect this release is necessary other than the release of pressure above the piston 18.

Figure 6:
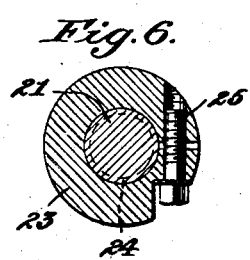
Fig. 6 is a detail view in section of the adjustable coupling for the removable heads shown in the several views.

Attached to the piston 18, in any suitable manner, is the thrust rod 21, said thrust rod passing through any suitable opening or guide 22 at its point of exit from the piston chamber 17. In that form of the invention where the lifting spring 20 used to elevate the piston and its associated parts, the opening 22, through which the thrust rod 21 passes, will be of such dimension in cross section as will permit pressure to escape past the thrust rod 21 so that if the fluid should get below the piston, it can escape and no opposing pressure will be built up below the piston 18. Secured to the lower end of the thrust rod 21 is the pressure head 23, this pressure head being adjustably secured so that the effective length of movement of the head may be varied. In the particular embodiment here shown, that adjustment is secured by a screw thread connection between the thrust rod 21 and the head 24, so that the head may be run up and down on the rod to shorten or lengthen its effective stroke. The said head, as shown in Fig. 6 is a partially split head, with the tightening screw 25, so that after the head 23 has been once adjusted for proper length of stroke, it may then be tightened in its adjusted position and danger of its movement on the screw-threaded connection 24 during operation of the machine is avoided.

The said head 23 is provided, at its lower end, with a recess in which is mounted a yielding pad 26, similar to the pad 14 heretofore described, and similarly disposed with respect to the recess, being somewhat smaller than that recess so as to avoid any danger of accumulation of back pressure beneath that pad, as pointed out in connection with the pad 14. Centrally of the pad 26 is a pipe 27 which projects upwardly into the head and is coupled with a lateral passage or pipe 28, at the outer end of which is mounted a cock or faucet 30, which may be turned to close the passage 28 and the vertical passage 27, or to open them as may be desired.

With the parts constructed as shown and described the operations for testing articles for porosity, and, in the case of key-cocks, for leakage past the keys, will be as follows. The cock, conventionally indicated in dotted lines, in Fig. 1, the particular type shown being a key-cock, will be placed in the position shown with one of its connecting nipples seated upon the pad 14 over the fluid pressure inlet 15 for the testing fluid. The fluid pressure will then be thrown by pipe 19 on to the piston 18, forcing it downwardly together with the thrust rod 21 and the head 23, which has been adjusted as to length of stroke for the particular type of cock being tested, so that the head 23 will come down upon the cock, and the pad 26, with the pipe 27, compressed upon it, and this compression being transmitted through the cock to the pad 14, fluid tight joints are formed with the open ends of the cock-body. The testing fluids will then be admitted by the pipe 16 and inlet 15 to the interior of the cock body, and if it be a key cock, the key will be turned to open position so that the testing fluid can fill the body of the cock. The faucet 30, at the end of the lateral passage 28, will be closed so that there can be no escape of fluid by that passage. The testing pressure can be run up to the desired degree, and the operator can observe the cock under pressure and determine whether or not it is defective by reason of porosity or fault in the metal, for under the retained pressure in the cock body, porosity will be shown by leakage through any fault in the wall of the cock body which may be present.

When it is desired to test for key faults in connection with key cocks of the type shown in Fig. 1, the key of the cock, will be turned to closed position, and the faucet 30, from the passage 28 and the passage 27, which communicates with the interior of the cock, will be opened. Pressure then being applied to the lower part of the cock through the passage 15, will stand against the closed key of the cock, and if there be any leakage about that key, so as to permit the testing fluid to pass, it will be at once apparent by reason of flow or drip from the faucet, any suitable waste being provided to receive drip from faucet 30.

Figure 7:
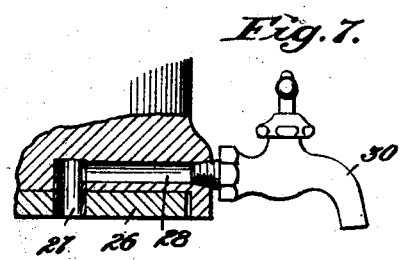
Fig. 7 is a detail sectional view of the relief device for the pressure heads shown in the several views.

In the form of the invention shown in Fig. 1, it will be observed that articles, such as cocks, can be tested where the ends of the cock body are in the same, or substantially the same, longitudinal line. In order that the device may be adapted to test angle cocks, without any material or substantial change in its structure, the form shown in Fig. 2 is provided. The form shown in Fig. 2 is identical in the main with that shown in Fig. 1, except that it has attachments which will be substituted where the device is used for testing angle cocks. It will have the same base, standard, and pressure cylinder, as described in connection with Fig. 1, but, in place of the upper pressure head 10 having the yielding pad to engage the cock body, there will be provided the head 29 which will be adjustably mounted and clamped upon the thrust rod 31 exactly as described in connection with the adjustable head of Fig. 1, and as shown in Fig. 4. Instead of the pressure pad to engage the cock body, the said head 29 will be provided with a depending valve engaging device 32, here shown as a fork, which passes beneath the handle of a valve so as to hold it firmly, which fork, will when the head is moved downwardly by the piston in the pressure cylinder 33, force the valve body down against the pad 34 in the boss 35 of the base of the machine, there being provided the same testing fluid inlet or pipe 36, as appears in Fig. 1. It will thus be seen that the angle cock is clamped in position against the lower pad exactly as in the other form of the invention. The angle cock has the side nipple 37, which may be disposed at various angles relative to the cock body and the inlet at the bottom of the valve, and in order that this may be sealed, we provide an attachment, comprising the bracket 38 which is secured to the base 35 of the device by being seated in a recess formed in the side wall of the base, as shown in Fig. 2 in dotted lines, and secure it in place by means of the single bolt 39 so that the bracket will be held firmly with respect to the main part of the machine. The bracket may, of course, take such angular position as the work demands. If the nipple 37 be at right angles, a bracket of right angular formation may be used. If it be inclined to an angle greater than a right angle to the body of the cock, as shown in Fig. 2, the bracket will be made with a corresponding incline. Mounted in suitable supports, as, for example, the lug 40 on the bracket 38, is a reciprocating head 41 having a recessed base and a sealing pad 42 of a character similar to that described in connection with the pressure head of the form shown in Fig. 1. Centrally of pad 42 is disposed the pipe 43, coupling with the branch passage 44 in a manner similar to the construction of the pad and head of the form shown in Fig. 1, and a faucet, similar to the faucet 30 shown in Fig. 7, may be attached to the lateral passage 44. The head 41 is provided with a thrust rod 45, headed or otherwise suitably formed at its rear end, so as to retain between the headed end and the lug 40 the spring 46, which spring tends normally to keep the head 41 in retracted position. Mounted on a suitable pivot lug 47 is an actuating cam 48, provided with a handle 49, which, when thrown to its operating position, will drive the head 43 inwardly against the nipple 37 so that the yielding pad 42 will seal that nipple, and the cock is then in position for testing.

The operations of testing with the angle cock type of device, both for wall porosity and key leakage, will be identical with the operations heretofore described in connection with Fig. 1.

Figure 5:
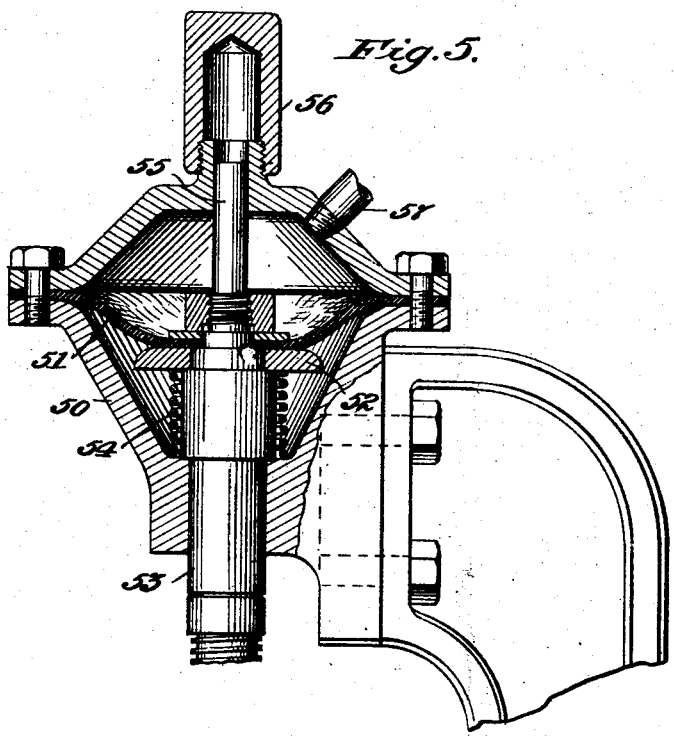
Fig. 5 is a detail of a different, but equivalent form of operating mechanism for the device shown in Fig. 2.

In the form of the invention shown in Fig. 5, an equivalent, but different, type of actuating mechanism is shown. Instead of the piston chamber disclosed in the other view and heretofore described, there is provided a diaphragm chamber 50 in which is clamped the diaphragm 51, having the usual pressure plate 52, and coupled to the diaphragm is the thrust rod 53, the parts being normally held in raised position by the spring 54 in the lower part of the diaphragm chamber engaging, at its upper end, the pressure plate 52. Preferably, the thrust rod will have an extension 55 at its upper end passing through a guide opening in the top of the diaphragm chamber and into a pressure retaining cap 56. There will be provided the pressure connection 57 from any suitable source of pressure, delivering above the diaphragm, and provided, of course, with suitable control devices for admitting and releasing pressure above the diaphragm. As shown in Fig. 5, the diaphragm is under pressure from the inlet 57, and forced downwardly, with the thrust rod 53, which carries the pressure head, in its down position. Obviously, instead of the spring lift for the diaphragm shown, such diaphragm could be operated in both directions by pressure by providing suitable inlet and exhaust connections, in a manner similar to that suggested in connection with the piston type of device.

From the foregoing, it will be seen that there is provided a testing machine which may be conveniently used for testing, both for porosity and for key leakage of valve bodies, valve seats and the like, without removing the cock from the machine, and that it is adapted for handling straightway cocks, angle cocks, etc., without any radical change in the construction or operation.

Mechanical changes, and the adoption of equivalent expedients, other than those herein shown, to carry out our invention, may be made without departing from the range thereof, and it will be understood, further, that the phrase "fluid pressure" includes hydraulic or air pressures.

We claim:

1. In apparatus for testing cocks and the like for porosity and key leakage, the combination of a base to receive a cock nipple and having an inlet for fluid pressure, a movable pressure head to engage the other nipple of the cock and having a fluid-pressure outlet passage providing circulation through said inlet, cock and outlet, and means for opening and closing said outlet passage.

2. In apparatus for testing cocks and the like for porosity and key leakage, the combination of a base having a resilient seat to receive a cock nipple and an inlet for fluid pressure, a normally retracted movable pressure head having a resilient seat to receive the other nipple of the cock and having a fluid pressure outlet passage providing circulation through said inlet, cock and outlet, and a control cock for said passage.

3. In apparatus for testing cocks and the like for porosity and key leakage, the combination of a base having a resilient seat to receive a cock nipple and an inlet for fluid pressure, a movable pressure head having a resilient seat to receive the other nipple of the cock, a fluid pressure outlet traversing said head providing circulation through said inlet, cock and outlet, means for controlling flow through said outlet, means normally to hold said head retracted, and means for moving said head.

4. In apparatus for testing cocks and the like for porosity and key leakage, the combination of a base having a resilient seat to receive a cock nipple and an inlet for fluid pressure, a movable pressure head having a resilient seat to receive the other nipple of the cock, a fluid pressure outlet traversing said head providing circulation through said inlet, cock and outlet, means for controlling flow through said outlet, a spring normally to hold said head retracted, and means for moving said head.

5. In apparatus for testing cocks and the like for porosity and key leakage, the combination of a base having a seat socket therein, a resilient seat in said socket to receive a cock nipple, a movable pressure head having a seat socket therein, a resilient seat in said socket to receive the other nipple of a cock, said seats and sockets being so related that back pressure on either seat will be automatically relieved, a fluid pressure outlet traversing said head, means for controlling flow through said outlet, a spring normally acting to hold said pressure head retracted, and means for moving said head.

6. In apparatus for testing cocks and the like for porosity and key leakage, the combination of a base having a seat socket therein, a resilient seat in said socket to receive a cock nipple, a movable pressure head having a seat socket therein, a resilient seat in said socket to receive the other nipple of a cock, said seats and sockets being so shaped and related that any back pressure in rear of either seat will escape at the periphery of the seat, a fluid pressure outlet traversing said head, means for controlling flow through said outlet, a spring normally acting to hold said pressure head retracted, and means for moving said head.

7. In apparatus for testing cocks and the like for porosity and key leakage, the combination of a base having a seat socket therein, a resilient seat of less diameter than said socket to relieve back pressure beneath said seat mounted in said socket, a movable pressure head for a seat socket therein, a resilient seat to receive the other nipple of said cock of less diameter than said socket to relieve back pressure beneath said seat mounted in said socket, a fluid pressure outlet traversing said head, means for controlling flow through said outlet, a spring normally to hold said pressure head retracted, and means for moving said head.

8. In a testing apparatus, a nipple engaging member having a seat receiving socket, a fluid pressure nipple projecting into said socket substantially centrally thereof, and a resilient seat loosely mounted in said socket to ensure release of back pressure and having a nipple receiving aperture.

9. In a testing apparatus, a nipple receiving member having a socketed seat, a fluid pressure nipple projecting into said socket substantially centrally thereof, and a resilient seat in the socket having a nipple receiving aperture, said seat and socket being so related that the seat will be automatically relieved from any back pressure beneath it.

10. In a testing apparatus, a nipple receiving member having a socketed seat, a fluid pressure nipple projecting into said socket substantially centrally thereof, and a resilient seat in the socket having a nipple receiving aperture, said seat and socket being so related that any back pressure beneath the seat will escape at the periphery thereof.

11. In a testing apparatus, the combination of a cock receiving member having a seat receiving socket, a fluid pressure nipple projecting into said socket substantially centrally thereof, a resilient seat of less area than said socket to permit relief of back pressure loosely mounted therein and having a nipple receiving aperture.

12. In apparatus for testing cocks and the like for porosity and key leakage, the combination of a seat to receive a cock nipple and having a fluid pressure inlet delivering through said seat, a movable pressure head to engage the opposite nipple of said cock and having a fluid outlet passage traversing said head, and a movable cock engaging clamp to engage said cock and hold it in position between said seats.

13. In apparatus for testing cocks and the like for porosity and key leakage, the combination of a seat to receive a cock nipple and having a fluid pressure inlet for said seat, a movable pressure head having a seat to engage the other nipple of a cock and having a fluid pressure outlet for said last named seat, and a movable cock engaging clamp to hold said cock between said seats.

14. In apparatus for testing angle cocks and the like, the combination of a base to receive a cock nipple and having a fluid pressure passage, a movable pressure head to engage the other nipple of a cock disposed at an angle to the axis of said base, and cock engaging means to clamp the cock on said base and head.

15. In apparatus for testing angle cocks and the like, the combination of a base to receive a cock nipple and having a fluid pressure passage, a movable pressure head to engage the other nipple of the cock disposed at an angle to the axis of said base, and a movable head to engage the cock between the base and pressure head to clamp it on said base and head.

16. In apparatus for testing angle cocks and the like, the combination of a base to receive a cock and having a fluid pressure passage, a normally retracted fluid pressure head to engage the other nipple of the cock disposed at an angle to the axis of said base, and cock engaging means movable substantially parallel to the axis of said base to clamp a cock in position.

17. In apparatus for testing angle cocks and the like, the combination of a base to receive a cock nipple and having a fluid pressure passage, a movable head to clamp a cock to said base and hold it against lateral displacement, a movable pressure head disposed at an angle to said cock to engage the other nipple of the cock, and means for actuating said pressure head.

18. In apparatus for testing angle cocks and the like, the combination of a base to receive a cock nipple and having a fluid pressure passage, a movable head having cock handle engaging means to clamp a cock upon said base and hold it against lateral displacement, a movable pressure head disposed at an angle and inclined relative to said cock to engage the other cock nipple, and means for actuating said pressure head.

19. A pressure head for testing apparatus having a socket in its face, a nipple projecting substantially centrally of said socket, a resilient seat mounted in said socket and having a nipple receiving aperture, said head having laterally disposed passage leading from said nipple at the outside of said head.

20. A pressure head for testing apparatus having a socket in its face, a nipple projecting substantially centrally of said socket, a resilient seat of less area than the socket mounted in said socket and having a nipple receiving aperture, a laterally disposed passage leading from said nipple at the outside of said head, and flow controlling means for said lateral passage.

21. A pressure head for testing apparatus having a solid nipple engaging portion and an integral split sleeve extending therefrom.

22. A pressure head for testing apparatus having a solid portion provided with a socketed nipple engaging portion, a resilient seat in said socketed portion, and an integral split sleeve extending therefrom.

23. A pressure head for testing apparatus having a solid portion provided with a socketed face, a resilient seat in said socket, a fluid passage traversing said solid portion and delivering to a lateral wall, and an integral threaded split sleeve extending from said solid portion.

24. In a testing apparatus, the combination of a base to receive a cock nipple and having an inlet for fluid pressure, a movable pressure head to engage the other nipple of the cock, and having a fluid outlet passage, manually controlled means for moving said pressure head in one direction, and means automatically to move said pressure head in the opposite direction.

25. In a testing apparatus, the combination of a base to receive a cock nipple and having an inlet for fluid pressure, a movable pressure head to engage the other nipple of the cock and having a fluid pressure outlet passage, manually controllable fluid pressure operating means for moving said pressure head in one direction, and means automatically to move said head in the opposite direction upon release of fluid pressure.

26. In a testing apparatus, the combination of a base to receive a cock nipple and having an inlet for fluid pressure, a movable pressure head to engage the other nipple of the cock and having a fluid pressure outlet passage, a manually controllable fluid pressure operated piston for moving said head in one direction, and means automatically to move said head and piston in the opposite direction on release of fluid pressure.

27. In a testing apparatus, the combination of a base to receive a cock nipple and having an inlet for fluid pressure, a movable pressure head to engage the other nipple of the cock and having a fluid pressure outlet passage, a fluid pressure operated piston for moving said head in one direction, and a spring automatically to move said head and piston in the opposite direction on release of fluid pressure.

28. In a testing apparatus, the combination of a base to receive a cock nipple and having an inlet for fluid pressure, a movable pressure head to engage the other nipple of the cock and having a fluid pressure outlet passage, a casing, a piston in said casing, a thrust rod coupling said piston and movable head, fluid pressure connections on one side of said casing to actuate said piston, and a spring on the other side of said piston automatically to move said piston in the opposite direction upon release of fluid pressure.

In testimony whereof we have hereunto set our hands.

ROBERT H. MUELLER.
CHESTER W. HATHAWAY.